(12) United States Patent
Ichinose et al.

(10) Patent No.: US 7,036,525 B2
(45) Date of Patent: May 2, 2006

(54) THREE-WAY BLEED TYPE PROPORTIONAL ELECTROMAGNETIC VALVE

(75) Inventors: Yuta Ichinose, Tokyo (JP); Takuya Uryu, Tokyo (JP); Kenji Nakao, Tokyo (JP); Yoshihiko Onishi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 20 days.

(21) Appl. No.: 10/839,244

(22) Filed: May 6, 2004

(65) Prior Publication Data

US 2005/0098211 A1    May 12, 2005

(30) Foreign Application Priority Data

Nov. 7, 2003  (JP) ............................ P2003-378691

(51) Int. Cl.
 *F15B 13/044* (2006.01)
 *F16K 11/24* (2006.01)

(52) U.S. Cl. .............................. 137/596.17; 251/129.15
(58) Field of Classification Search ........... 137/596.17; 251/129.15
See application file for complete search history.

(56) References Cited

U.S. PATENT DOCUMENTS

| | | | | |
|---|---|---|---|---|
| 5,109,886 A | * | 5/1992 | Takata et al. | 137/596.17 |
| 6,619,616 B1 | * | 9/2003 | Sudani et al. | 137/596.17 |
| 6,827,102 B1 | * | 12/2004 | Weber | 137/596.17 |
| 6,874,533 B1 | * | 4/2005 | Weber | 137/596.17 |

FOREIGN PATENT DOCUMENTS

JP        2002-286152 A    10/2002

* cited by examiner

*Primary Examiner*—Ramesh Krishnamurthy
(74) *Attorney, Agent, or Firm*—Sughrue Mion, PLLC

(57) ABSTRACT

A bleed-type proportional electromagnetic valve having an input port, output port, and ejection port is disclosed. Fluid force and pressing force, proportionate to an output pressure and a current flowing in a solenoid coil respectively, act on a bleed valve for controlling the output pressure, whereby the valve can obtain an output pressure commensurate to the flowing current by displacing the valve to a position that those forces counterbalance, wherein the valve is provided with a stop valve disposed so as to be in sliding contact with a passage between the input and output port, and in contact with or separated from a valve seat. This enable the stop valve to contact with the valve seat so as to close the input port and communicate the output port with the ejection port when controlling the output pressure to be minimum.

20 Claims, 14 Drawing Sheets

A-A

REGIONS OF
CONTACT
WITH BLEED
VALVE ELEMENT

THREE-WAY BLEED TYPE PROPORTIONAL ELECTROMAGNETIC VALVE

BACKGROUND OF THE INVENTION

1. Field of the Invention

The present invention relates to a three-way bleed type proportional electromagnetic valve in which the fluid force that is proportional to the output pressure and the pressing force that is proportional to the energization current of a solenoid coil act on a bleed-valve element and the bleed valve element is displaced to a position where the two kinds of force are balanced with each other, whereby the output pressure is made proportional to the energization current.

2. Description of the Related Art

In hydraulic circuits of electronic control type automatic transmissions (hereinafter abbreviated as ATs) for automobiles, a bleed type proportional electromagnetic valve in which the output pressure is controlled so as to be proportional to the energization current is used to change the operating oil pressure of each operating portion of an AT.

First, a description will be made of a method for using a bleed type proportional electromagnetic valve in a hydraulic circuit of the AT. Automatic transmission fluid (hereinafter abbreviated as ATF) stored in an oil pan is sucked by an oil pump that is driven in synchronism with an engine. After its pressure is adjusted to a prescribed value by a regulator or the like, the ATF is compression-transported to the input port of each electromagnetic valve. The bleed type proportional electromagnetic valve can produce a prescribed output pressure by controlling the load imposed on the bleed valve element by controlling the current supplied to the solenoid coil in accordance with the automobile running state. A gear shift is effected by controlling the opening/closing of a control valve provided in the hydraulic circuit of the AT using the above output pressure. ATF that has passed the bleed valve element of the bleed type proportional electromagnetic valve is collected into the oil pan via an ejection port.

The flow rate of the oil pump, which is a gear pump or the like, is always set to a maximum necessary value. Since the oil pump discharges ATF at a maximum flow rate, the reduction of the energy consumption of the oil pump is an important factor in increasing the fuel efficiency.

The structure of the bleed type proportional electromagnetic valve is generally classified into two types by the relationship between the energization current and the output pressure. The first type is a normally high type (hereinafter abbreviated as "N/H type") in which the output pressure is high in a non-energization state and decreases as the current increases. The second type is a normally low type (hereinafter abbreviated as "N/L type") in which, conversely, the output pressure is low in a non-energization state and increases with the current.

FIGS. 11 and 12 are sectional views showing a conventional N/H-type, two-way bleed type proportional electromagnetic valve. As shown in FIGS. 11 and 12, a solenoid coil 2 is provided inside a cylindrical case 1 that defines a main body outward shape. The solenoid coil 2 has a terminal 3 and a connector 4 for its energization from an external power source. A core (fixed core) 5 and a yoke 6 for formation of a closed magnetic path are fixed to the respective ends of the case 1 by welding so as to house the solenoid coil 2. A housing 7 to be inserted into a valve body (not shown) of the hydraulic circuit of the AT is fixed to the yoke 6 by welding. The yoke 6 is provided with a bleed valve guide 6a that extends inward so as to taper.

The housing 7 is provided with an ATF input port 7a, output port 7b, and ejection port 7c. A valve seat 8 is press-fit in the housing 7, that is, in the flow passage connecting the input port 7a and the output port 7b to the ejection port 7c. The valve seat 8 is formed with a bleed valve seat portion 8a on its ejection port 7c side. A spherical bleed valve element 9 is loosely fit in the bleed valve guide 6a so as to be slidable. O-rings 10a and 10b are provided for sealing between the ports 7a–7c. The thus-configured bleed-type proportional electromagnetic valve is fixed to the valve body by bolts or the like via a flange (not shown) that is fixed to the housing 7 by welding.

A plunger 11 as a movable core is disposed inside the solenoid coil 2. A rod 12 is press-fit in the inner circumferential surface of the plunger 11 coaxially and hence is movable together with the plunger 11. The rod 12 is supported by, that is, loosely fit in, non-magnetic sliding bearings 13 and 14 located on both sides with the plunger 11 interposed in between. The one sliding bearing 13 is press-fit in the bleed valve guide 6a of the yoke 6 and the other sliding bearing 14 is loosely fit in the inner circumferential surface of the core 5.

To prevent an operation failure due to magnetic sticking of the core 5 and the plunger 11, an annular, non-magnetic stopper 15 is disposed around the rod 12 so as to be in contact with the end face of the plunger 11. A spring 16 for output pressure adjustment is disposed between the end face of the stopper 15 and the sliding bearing 14. A load adjusting member 17 such as a spring pin is press-fit in the inner circumferential surface of the core 5 so as to compress the spring 16 via the sliding bearing 14. In this state, the rod 12 is pressed via the stopper 15 and the plunger 11 and the yoke-6-side end face of the rod 12 presses the bleed valve element 9. As a result, the bleed valve element 9 rests on the bleed valve seat portion 8a and the valve is closed.

Next, the operation of the N/H-type, two-way bleed type will be described. First, in a state that the solenoid coil 2 is not energized as shown in FIG. 11, as described above the compressed spring 16 presses the end face of the plunger 11 via the stopper 15 and hence the rod 12, which is integral with the plunger 11, presses the bleed valve element 9 against the bleed valve seat portion 8a. A maximum output pressure is obtained when the output pressure of ATF flowing through the output port 7b after passing through the input port 7a and the housing 7 is balanced with the pressing force acting on the bleed valve element 9 from the rod 12 (i.e., the force from the compressed spring 16) divided by the area S ($=\pi(\phi d)^2/4$; $\phi d$: diameter of the bleed valve seat 8) of the bleed valve seat 8. The maximum output pressure can be set in a range that it is lower than the input pressure by adjusting the force from the compressed spring 16 by adjusting the press fit length of the load adjusting member 17.

When the solenoid 2 is energized via the terminal 3, a magnetic field is generated and a closed magnetic circuit is formed by the case 1, the core 5, the plunger 11, and the yoke 6. As a result, magnetic attractive force is generated between the excited core 5 and the plunger 11 in the movable direction of the plunger 11. Since the magnetic attractive force acts against the force from the spring 16, the pressing force acting on the bleed valve element 9 from the rod 12 is decreased ((force from compressed spring 16)−(magnetic attractive force)). The individual parts are shaped so that the pressing force becomes proportional to the current independently of the position of the plunger 11 in its movable range. That is, when the current is constant, the pressing force is constant independently of the position of the plunger 11.

As a result, the bleed valve element 9 is separated from the bleed valve seat portion 8*a* and displaced to a position where the pressing force acting on the bleed valve element 9 from the rod 12 is balanced with the fluid force that is proportional to the output pressure at the output port 7*b*. As the current flowing through the solenoid coil 2 increases, the pressing force acting on the bleed valve element 9 from the rod 12 decreases and hence the output pressure also decreases. In a state that the output pressure is controlled to a minimum value, the input port 7*a* communicates with the ejection port 7*c* and hence part of the AFT flows from the input port 7*a* to the ejection port 7*c*.

In an ordinary output pressure control, the magnetic attractive force is controlled by the current so as to be weaker than the force from the compressed spring 16 and hence the plunger 11 does not contact the core 5 via the stopper 15. However, if the current is so large that the magnetic attractive force is stronger than the force form the compressed spring 16, the stopper 15 that is attached to the plunger 11 is kept in contact with the core 5 as shown in FIG. 12.

FIGS. 13 and 14 show a conventional N/L-type, two-way bleed type proportional electromagnetic valve, which is approximately the same in configuration as the above N/H-type two-way bleed type proportional electromagnetic valve except for the following points. The core 5 and the yoke 6 are arranged in the opposite manner. Both of sliding bearings 18 and 19 are press-fit; in particular, the sliding bearing 19 is formed with a flange and thereby given a stopper function of stopping the plunger 11. The spring 16 for output pressure adjustment and the load adjusting member 17 are absent. The stopper 15 for preventing sticking of the core 5 and the plunger 11 is absent. Further, in a non-energization state, the bleed valve element 9 is separated from the bleed valve seat portion 8*a* by the fluid force that is proportional to the output pressure, whereby the valve is opened.

Next, the operation of this type of proportional electromagnetic valve will be described. In a state that the solenoid coil 2 is not energized (see FIG. 13), the fluid force that is proportional to the output pressure acts on the bleed valve element 9 and hence the bleed valve element 9 is separated from the bleed valve seat portion 8*a*: a minimum output pressure is obtained. Since the input port 7*a* communicates with the ejection port 7*c*, part of the AFT flows from the input port 7*a* to the ejection port 7*c*.

When the solenoid 2 is energized via the terminal 3, a magnetic field is generated and a closed magnetic circuit is formed by the case 1, the core 5, the plunger 11, and the yoke 6. As a result, magnetic attractive force is generated between the excited core 5 and the plunger 11 in the movable direction of the plunger 11. The magnetic attractive force acts in such a direction as to move the bleed valve element 9 closer to the bleed valve seat 8, that is, pressing force (=magnetic attractive force) acts on the bleed valve element 9 from the rod 12. The individual parts are shaped so that the pressing force becomes proportional to the current independently of the position of the plunger 11 in its movable range. That is, when the current is constant, the pressing force is constant independently of the position of the plunger 11.

As a result, the bleed valve element 9 is displaced to a position where the pressing force acting on the bleed valve element 9 from the rod 12 is balanced with the fluid force that is proportional to the output pressure at the output port 7*b*. As the current flowing through the solenoid coil 2 increases, the pressing force acting on the bleed valve element 9 from the rod 12 increases and hence the output pressure also increases. A maximum output pressure is obtained when the pressing force is stronger than the input pressure multiplied by the area S ($=\pi(\phi d)^2/4$; $\phi d$: diameter of the bleed valve seat 8) of the bleed valve seat 8 and hence the bleed valve element 9 rests on the bleed valve seat portion 8*a* (the valve is closed). FIG. 14 shows this state.

As described above, in each of the N/H-type valve and the N/L-type valve, a state that the input port 7*a* and the ejection port 7*c* communicate with each other occurs when the output pressure is controlled to the minimum value. Therefore, ATF flows from the input port 7*a* to the ejection port 7*c*, which increases the necessary flow rate of the oil pump for giving input pressure to the input port 7*a* and hence increases the size of the oil pump. This results in a problem that the energy that is consumed by the oil pump is increased. To solve this problem, a three-way bleed type proportional electromagnetic valve has been proposed as disclosed in Japanese patent publication JP-A-2002-286152.

In the valve disclosed in the patent publication, when the output pressure is controlled to a minimum value, a state that the input port and the ejection port are isolated from each other and a state that the output port and the ejection port communicate with each other are established, whereby ATF is prevented from flowing from the input port to the ejection port. However, the valve of patent document-1 employs a structure that a stop valve element (ball valve element 24) can contact and be separated from a bleed valve element (composed of a bleed valve element portion 3 and a rod portion 4) for controlling the output pressure. In particular, the stop valve element is a spherical poppet valve (ball valve element 24). Therefore, force acts on the ball valve element because of a pressure of AFT flowing around the ball valve element and only the axial component (i.e., the component toward the bleed valve element) of that force serves as a load that is imposed on the bleed valve element.

As a result, the flow of ATF around the ball valve element is unstable depending on the flow rate of the AFT and the oil passage shape and the pressure distribution on the surface of the ball valve element every moment. Therefore, the force acting on the ball valve element is also unstable and its axial component influences the behavior of the bleed valve element, resulting in a problem that the output pressure and flow rate characteristics are unstable. To solve this problem, it is necessary to stabilize the axial component of the force acting on the ball valve element. However, much time is needed to optimize the oil passage shape etc., which increases the development cost.

SUMMARY OF THE INVENTION

The present invention has been made to solve the above problems, and an object of the invention is therefore to provide a three-way bleed type proportional electromagnetic valve that makes it possible to realize, while stabilizing the output pressure and flow rate characteristics, a structure in which operation fluid does not flow from the input port to the ejection port when the output pressure is controlled to a minimum value.

The invention provides a three-way bleed type proportional electromagnetic valve comprising a solenoid coil; a core that is excited by energizing the solenoid coil; a plunger on which magnetic attractive force is exerted from the core when the core is excited; a bleed valve element that is in contact with or separated from a valve seat depending on the magnetic attractive force acting on the plunger; a housing that houses the valve seat and the bleed valve element and has an input port, an output port, and an ejection port for control subject fluid; and a stop valve element that is disposed in a flow passage between the input port and the output port so as to be in sliding contact with a wall of the flow passage and that is in contact with or separated from the valve seat, wherein in controlling an output pressure to a minimum value the stop valve element is brought in contact with the valve seat so as to close the input port and to cause the output port and the ejection port to communicate with each other.

The three-way bleed type proportional electromagnetic valve according to the invention provides an advantage that in controlling the output pressure to a minimum value the operation fluid can easily be prevented from flowing from the input port to the ejection port in such a manner that the output pressure and flow rate characteristics are kept stable.

DESCRIPTION OF THE PREFERRED EMBODIMENTS

Embodiment 1

Figure 1:
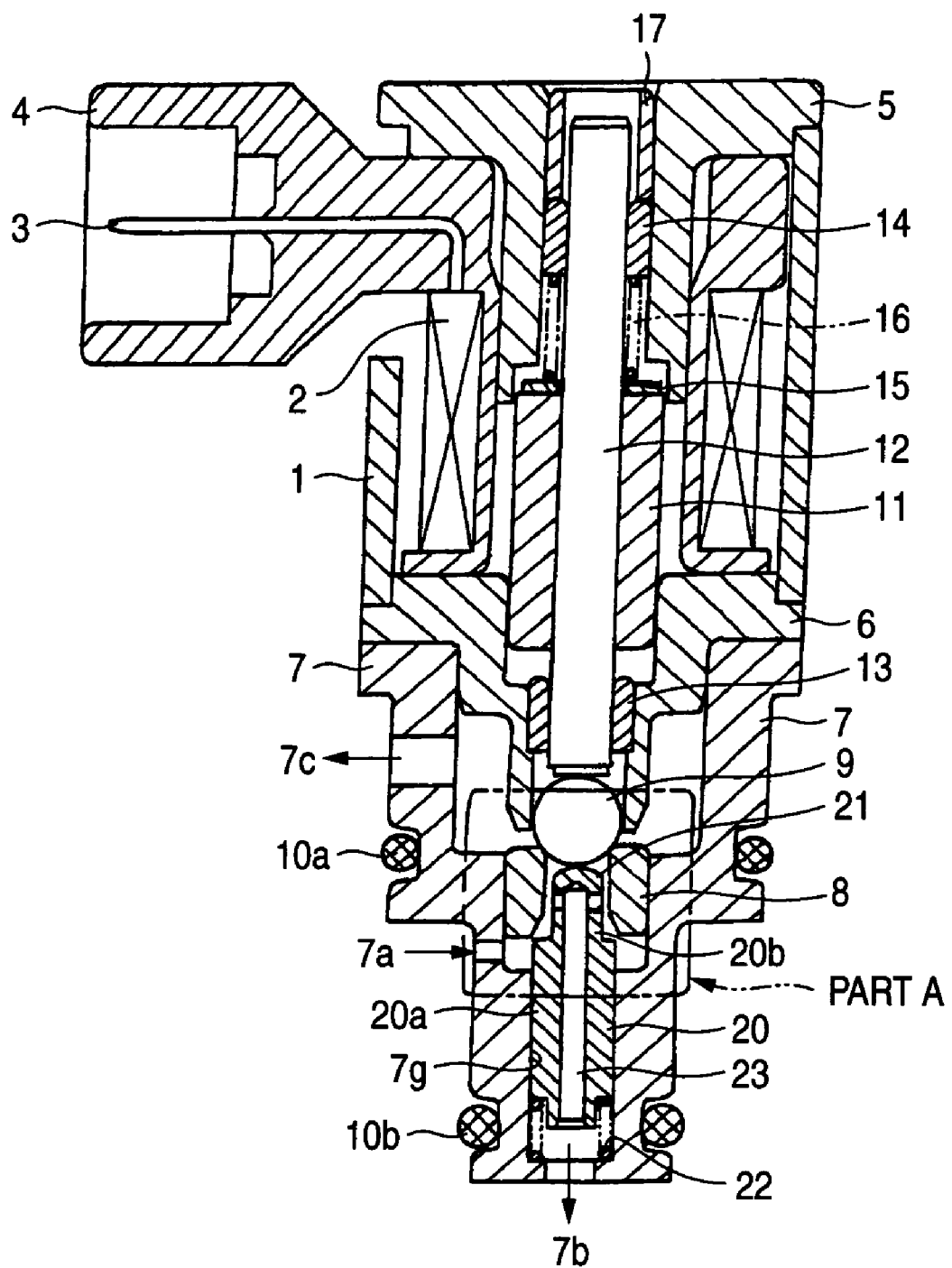
FIG. 1 is a sectional view of an N/H-type, three-way bleed type proportional electromagnetic valve according to a first embodiment of the present invention in a non-energization state.
Figure 2:
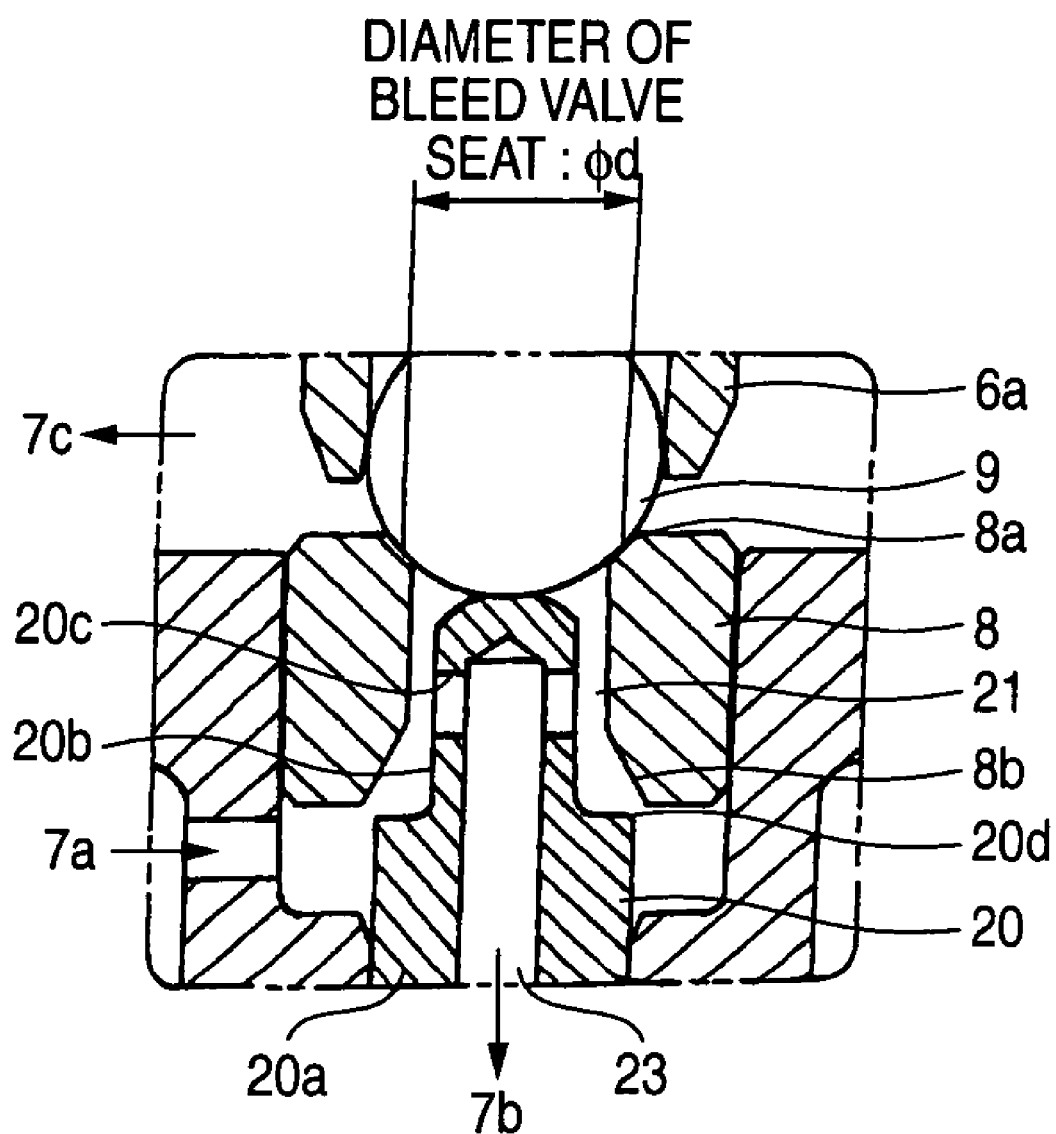
FIG. 2 is an enlarged view of part A in FIG. 1.
Figure 11:
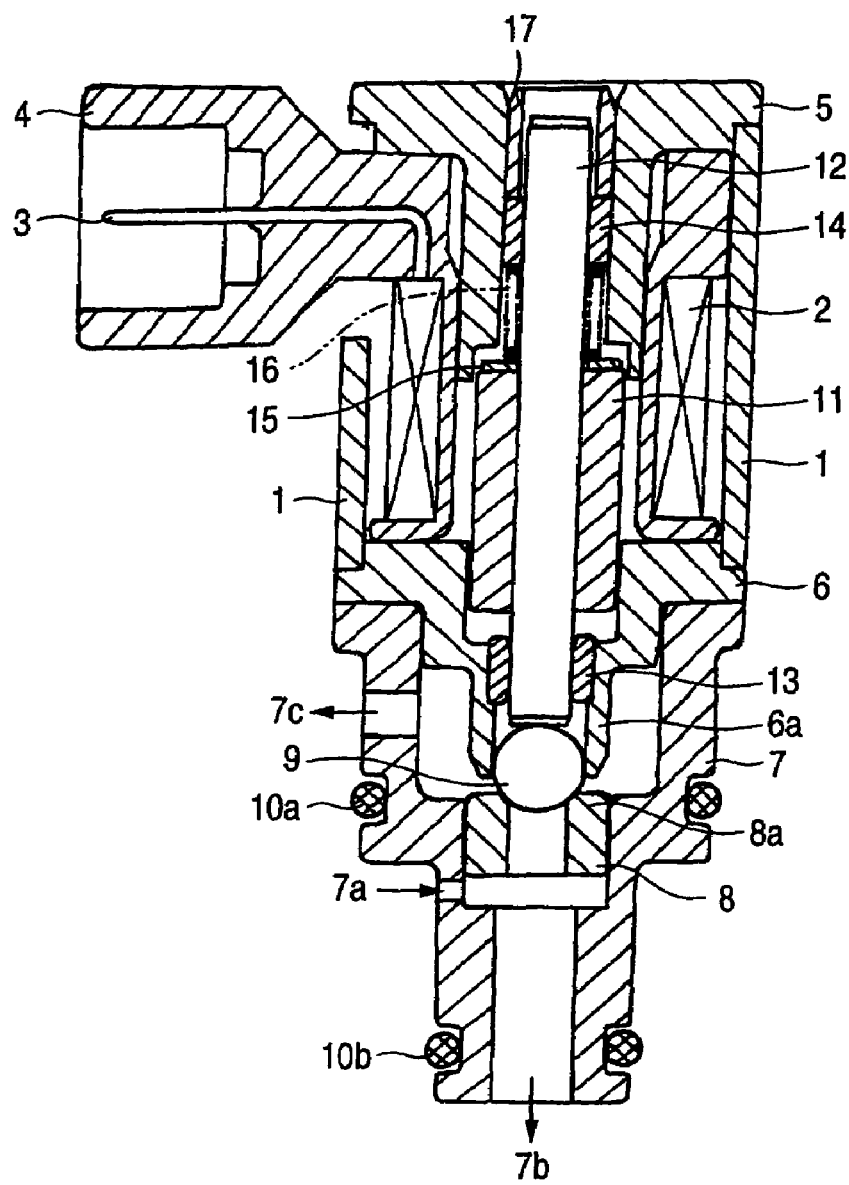
FIG. 11 is a sectional view of a conventional N/H-type, two-way bleed type proportional electromagnetic valve in a non-energization state.
Figure 12:
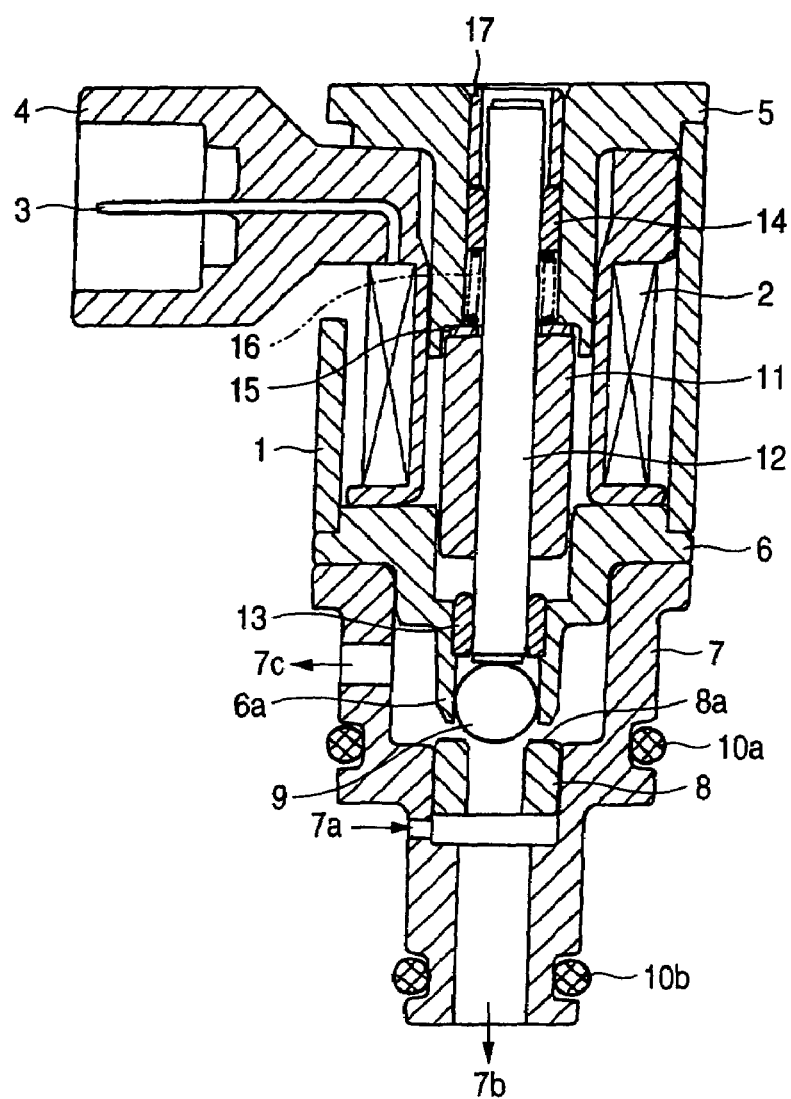
FIG. 12 is a sectional view of the conventional N/H-type, two-way bleed type proportional electromagnetic valve in an energized state.
Figure 13:
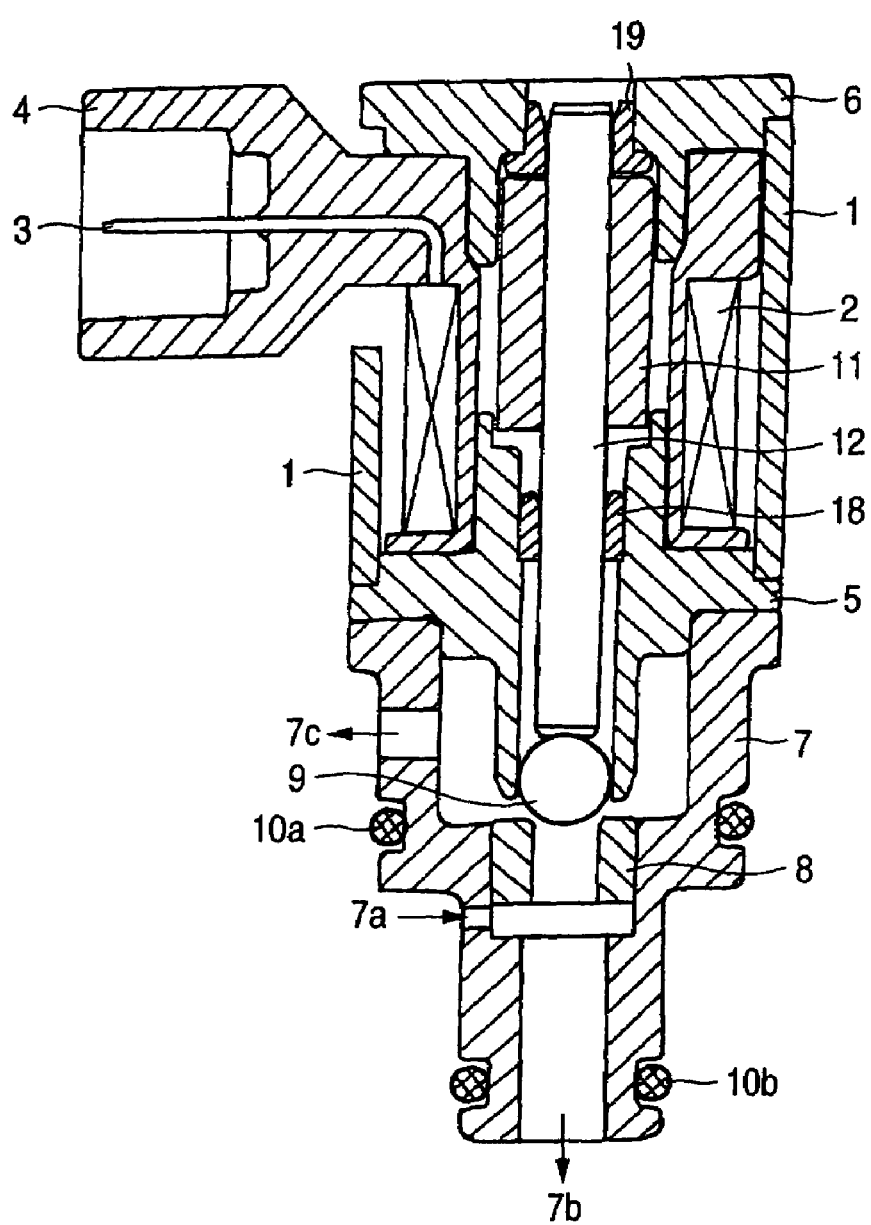
FIG. 13 is a sectional view of a conventional N/L-type, two-way bleed type proportional electromagnetic valve in a non-energization state.
Figure 14:
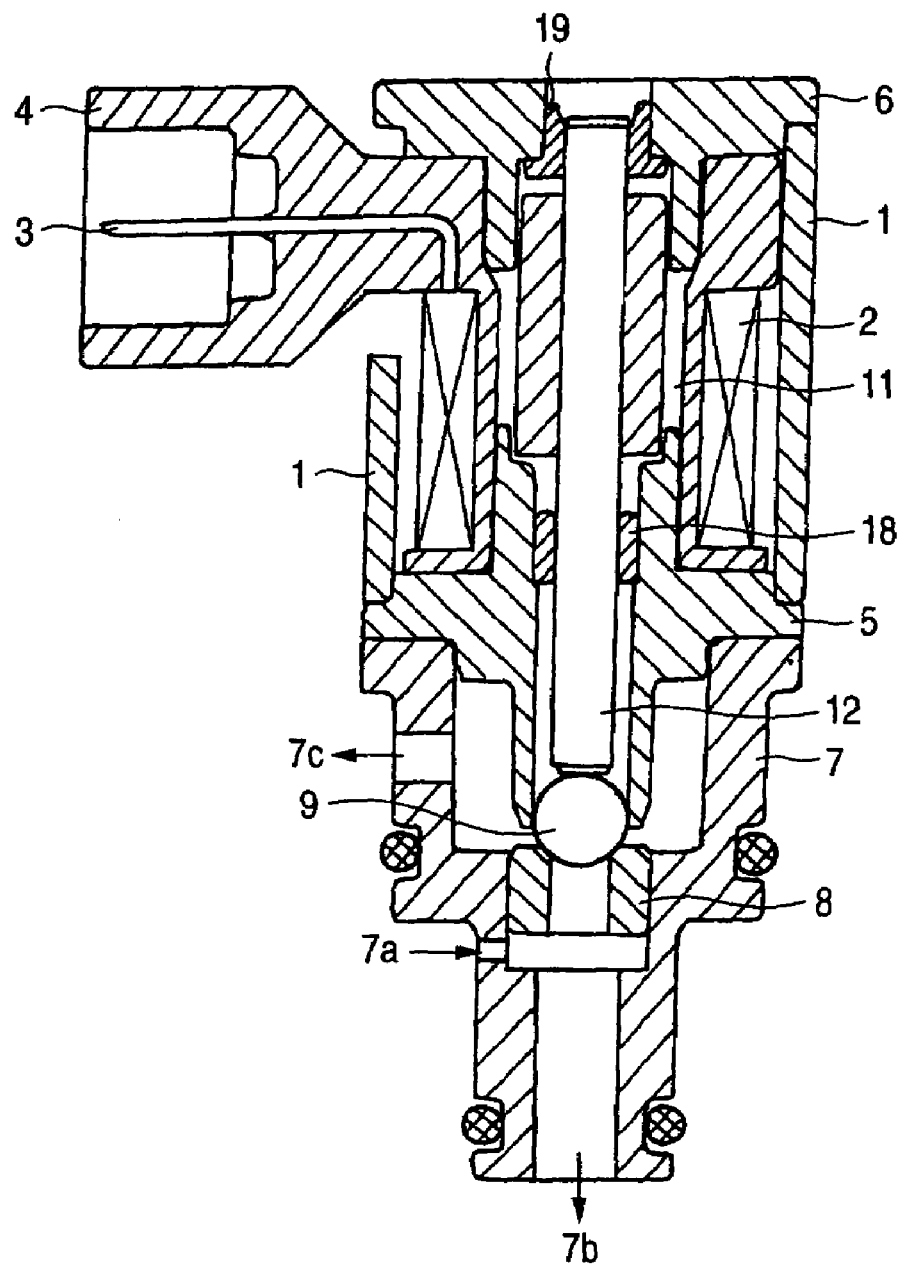
FIG. 14 is a sectional view of the conventional N/L-type, two-way bleed type proportional electromagnetic valve in an energized state.

FIGS. 1–4 are sectional views of an N/H-type, three-way bleed type proportional electromagnetic valve according to a first embodiment of the present invention. FIG. 1 shows states of individual members in a non-energization state, and FIG. 2 is an enlarged view of part A in FIG. 1. Members in FIGS. 1–4 having the same or corresponding members in FIGS. 11 and 12 are given the same reference symbols as the latter and will not be described. The following description will be mainly directed to novel features.

According to the first embodiment of the invention, a stop valve element 20 is disposed in the flow passage between the input port 7a and the output port 7b of the housing 7. The stop valve element 20 is generally shaped like a cylinder and is stepped, that is, consists of a large-diameter portion 20a and a small-diameter portion 20b. The stop valve element 20 is loosely fit in a stop valve guide 7g (that is formed inside the housing 7 adjacent to the above flow passage) in such a manner that the large-diameter portion 20a can slide on the stop valve guide 7g in the axial direction. The radial clearance and the sealing length (in the axial direction) of the sliding contact portion are set to such values that the flow passage between the input port 7a and the output port 7b is closed there. The valve seat 8 is formed with a stop valve seat portion 8b so that a stop valve sealing edge 20d that is an edge of the stop valve element 20 can rest thereon. The small-diameter-portion 20b of the stop valve element 20 is inserted in a valve seat communication hole 21 and the end of the small-diameter-portion 20b can contact and be separated from the spherical bleed valve element 9.

A flow passage that is sufficiently wide for the output pressure control is secured between the outer circumferential surface of the small-diameter portion 20b of the stop valve element 20 and the wall of the valve seat communication hole 21. A spring 22 is disposed between the other end of the stop valve element 20 and a brim that is formed at the output port 7b of the housing 7. The compressed spring 22 generates force in such a direction as to cause the stop valve sealing edge 20d of the stop valve element 20 to rest on the stop valve seat portion 8b of the valve seat 8. A stop valve element communication hole 23 is formed in the stop valve element 20. The stop valve element communication hole 23 has one opening at the output-port-7b-side end of the stop valve element 20. At the other end, the stop valve element communication hole 23 communicates with bleed valve element communication holes 20c that are formed through the side wall of the small-diameter portion 20b.

The maximum displacement of the stop valve element 20 is set longer than that of the bleed valve element 9 that can control the output pressure in a necessary range.

As is apparent from the above configuration, unlike in the conventional two-way bleed type proportional electromagnetic valve, the three-way bleed type proportional electromagnetic valve according to this embodiment can be attached without the need for changing the attachment shape including the port positions, the internal components, etc.

Next, the operation of the first embodiment will be described. In a state that the solenoid coil 2 is not energized, as shown in FIGS. 1 and 2 the bleed valve element 9 rests on the bleed valve seat portion 8a because it receives force from the compressed spring 16: the flow passage between the input port 7a and the ejection port 7c is closed. On the other hand, the stop valve element 20 is in contact with the bleed valve element 9 and the stop valve sealing edge 20d of the stop valve element 20 is separated from the stop valve seat portion 8b of the valve seat 8. Therefore, the input port 7a and the output port 7b communicate with each other. In this state, the input pressure at the input port 7a is applied to the output port 7b via the stop valve element communication hole 23 and hence the output pressure is at the maximum.

When a current that is necessary to control the output pressure in an ordinary range is supplied to the solenoid coil 2, the bleed valve element 9 is separated from the bleed valve seat portion 8a (this state is not shown in any drawings): the input port 7a and the ejection port 7c communicate with each other. On the other hand, the stop valve element 20 is displaced together with the bleed valve element 9 while kept in contact with the bleed valve element 9. However, since the stop valve sealing edge 20d is still separated from the stop valve seat portion 8b, the input port 7a and the output port 7b communicate with each other. In this state, the output pressure varies in proportion to the energization current. And force originating from pressure that is generated by ATF flowing inside and outside the stop valve element 20 acts on the stop valve element 20. However, since the output pressure acts on the ends of the stop valve element 20 on both sides of the sliding contact portion, the axial components (i.e., the components toward and going away from the bleed valve element 9) of the force cancel out each other and hence no effective axial component remains. That is, only the force originating from the compressed spring 22 acts from the stop valve element 20 to the bleed valve element 9. Stable force that does not depend on the AFT flow state acts on the bleed valve element 9. Therefore, the output pressure and flow rate characteristics are very stable and the problem of the conventional valve is solved.

Figure 3:
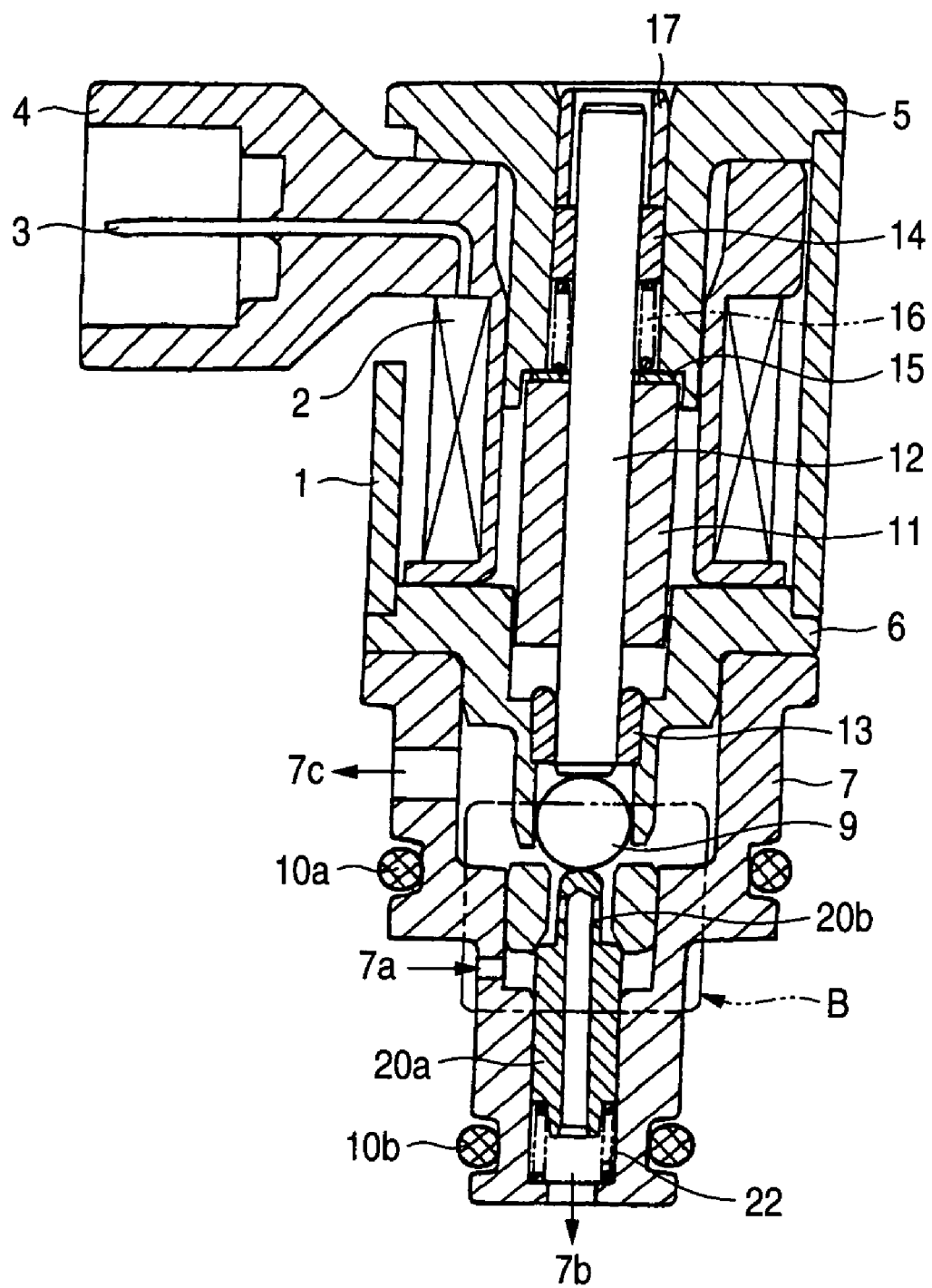
FIG. 3 is a sectional view of the N/H-type, three-way bleed type proportional electromagnetic valve according to the first embodiment of the present invention in an energized state.
Figure 4:
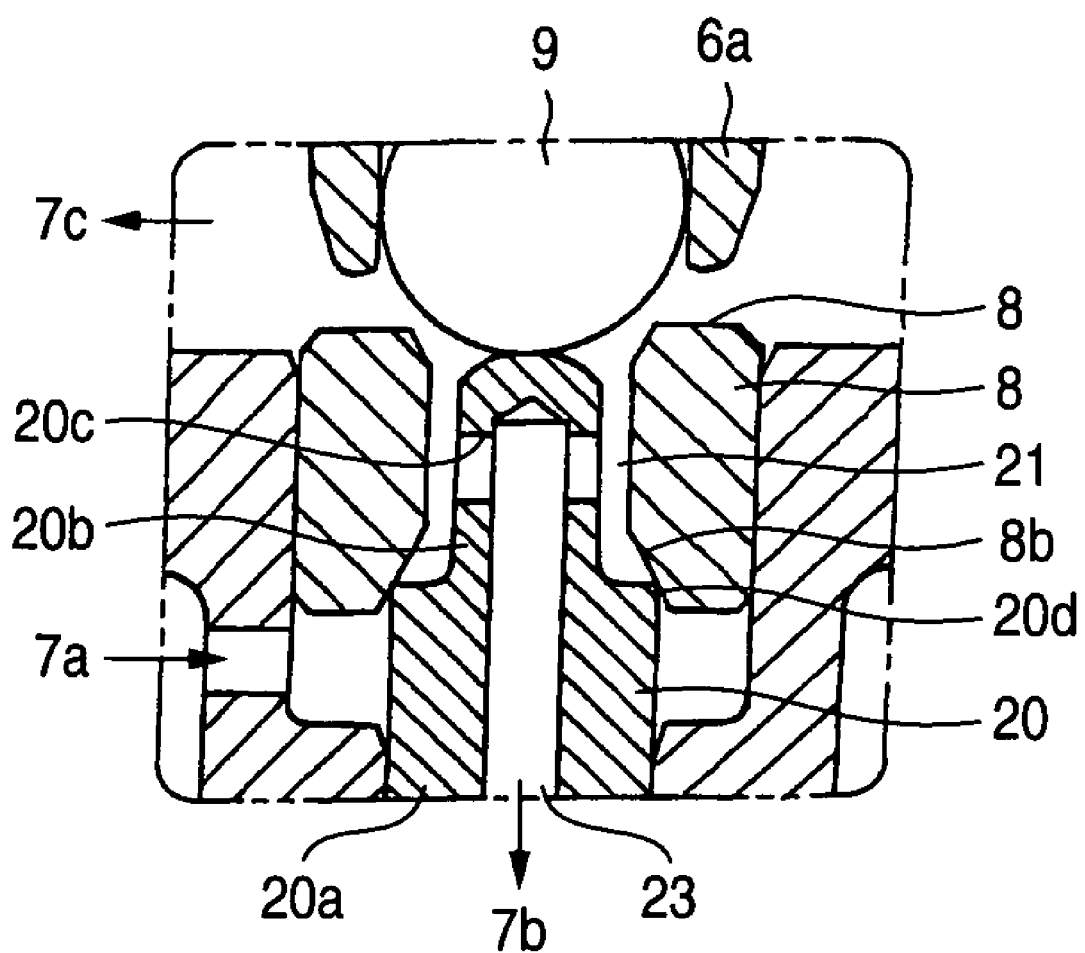
FIG. 4 is an enlarged view of part B in FIG. 3.

An operation in a case that a current that is larger than the above current and is so large that the magnetic attractive force acting on the plunger 11 is stronger than the force from the compressed spring 16 will be described with reference to FIGS. 3 and 4. FIG. 3 shows states of the individual members in an energized state, and FIG. 4 is an enlarged view of part B in FIG. 3. In this state, the stopper 15 that is located at the top of the plunger 11 is in contact with the core 5 (i.e., the plunger is located at its highest position in FIG. 3). The stop valve sealing edge 20d of the stop valve element 20 rests on the stop valve seat portion 8b because of the force from the compressed spring 22. On the other hand, whereas the bleed valve element 9 is separated from the rod 12, the bleed valve element 9 is kept in contact with the stop valve element 20 and is most distant from the bleed valve seat portion 8a.

Therefore, the flow passages between the input port 7a and the other ports 7b and 7c are closed, which prevents ATF from flowing from the input port 7a to the ejection port 7c. At the same time, the output port 7b and the ejection port 7c communicate with each other and hence the output pressure is at the minimum. Since the flow passage between the input port 7a and the ejection port 7c is closed in the state that the output pressure is at the minimum, AFT does not flow from the input port 7a to the ejection port 7c. Therefore, the flow rate of AFT that is output from the oil pump to produce a necessary input pressure at the input port 7a can be reduced and the capacity of the oil pump can be optimized and the energy consumption of the oil pump can be reduced.

Embodiment 2

Figure 5:
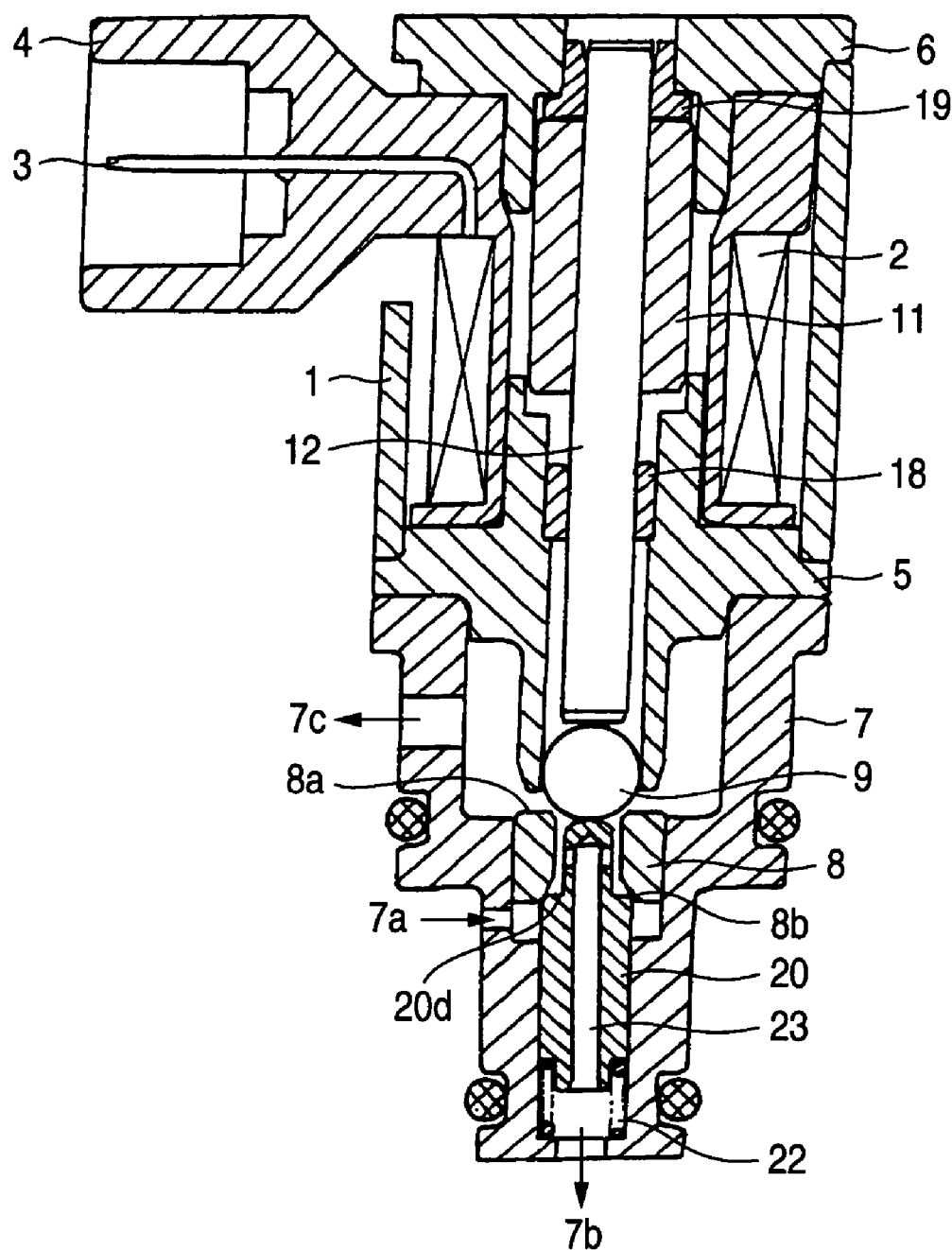
FIG. 5 is a sectional view of an N/L-type, three-way bleed type proportional electromagnetic valve according to a second embodiment of the invention in a non-energization state.
Figure 6:
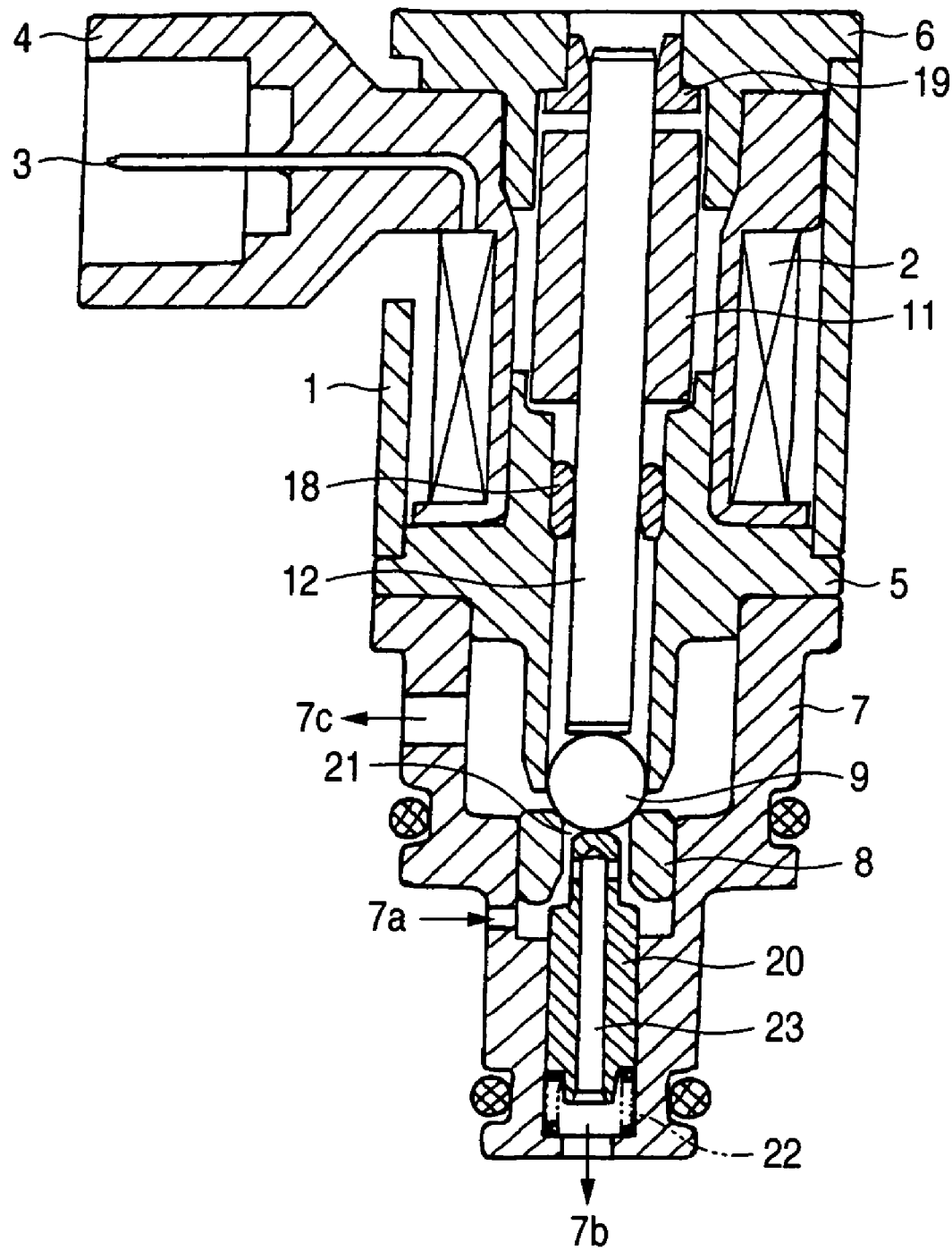
FIG. 6 is a sectional view of the N/L-type, three-way bleed type proportional electromagnetic valve according to the second embodiment of the invention in an energized state.

FIGS. 5 and 6 show an N/L-type, three-way bleed type proportional electromagnetic valve according to a second embodiment of the invention. This valve is similar in configuration to the N/H-type three-way bleed type proportional electromagnetic valve according to the first embodiment and has the same differences from it as the differences between the conventional N/L-type and N/H-type, two-way bleed type proportional electromagnetic valves that were described in the background section. The principle of operation of this N/L-type valve is similar to that of the N/H-type valve according to the first embodiment and hence will be described below only briefly. In a state that the solenoid coil 2 is not energized, as shown in FIG. 5 the stop valve sealing edge 20d of the stop valve element 20 rests on the stop valve seat portion 8b because of the force from the compressed spring 22.

On the other hand, the bleed valve element 9 is in contact with the stop valve element 20 and is most distant from the bleed valve seat portion 8a. Therefore, the flow passages between the input port 7a and the other ports (i.e., the output port and the ejection port) 7b and 7c are closed, which prevents ATF from flowing from the input port 7a to the ejection port 7c. At the same time, the output port 7b and the ejection port 7c communicate with each other and hence the output pressure is at the minimum. Since the flow rate of AFT that is output from the oil pump to produce a necessary input pressure at the input port 7a can be reduced, the capacity of the oil pump can be optimized and the energy consumption of the oil pump can be reduced.

When a current that is necessary to control the output pressure in an ordinary range is supplied to the solenoid coil 2, the bleed valve element 9 is displaced in such a direction that it will rest on the bleed valve seat portion 8a. The stop valve element 20 that is in contact with the bleed valve element 9 is displaced together with the bleed valve element 9 and the stop valve sealing edge 20d is separated from the stop valve seat portion 8b. Therefore, the input port 7a communicate with both of the ejection port 7c and the output port 7b. In this state, the output pressure varies in proportion to the energization current.

Force originating from pressure that is generated by ATF flowing inside and outside the stop valve element 20 acts on the stop valve element 20. However, since the output pressure acts on the ends of the stop valve element 20 on both sides of the sliding contact portion, the axial components (i.e., the components toward and going away from the bleed valve element 9) of the force cancel out each other and hence no effective axial component remains. That is, only the force originating from the compressed spring 22 acts from the stop valve element 20 to the bleed valve element 9. Stable force that does not depend on the AFT flow state acts on the bleed valve element 9. Therefore, the output pressure and flow rate characteristics are stable.

When a current that is large enough to cause the bleed valve element 9 to rest on the bleed valve seat portion 8a is applied to the solenoid coil 2, as shown in FIG. 6 the flow passage between the input port 7a and the ejection port 7c is closed and the input port 7a and the output port 7b communicate with each other. Since the input pressure at the input port 7a is applied to the output port 7b via the stop valve element communication hole 23, the output pressure is at the maximum.

Embodiment 3

Figure 7:
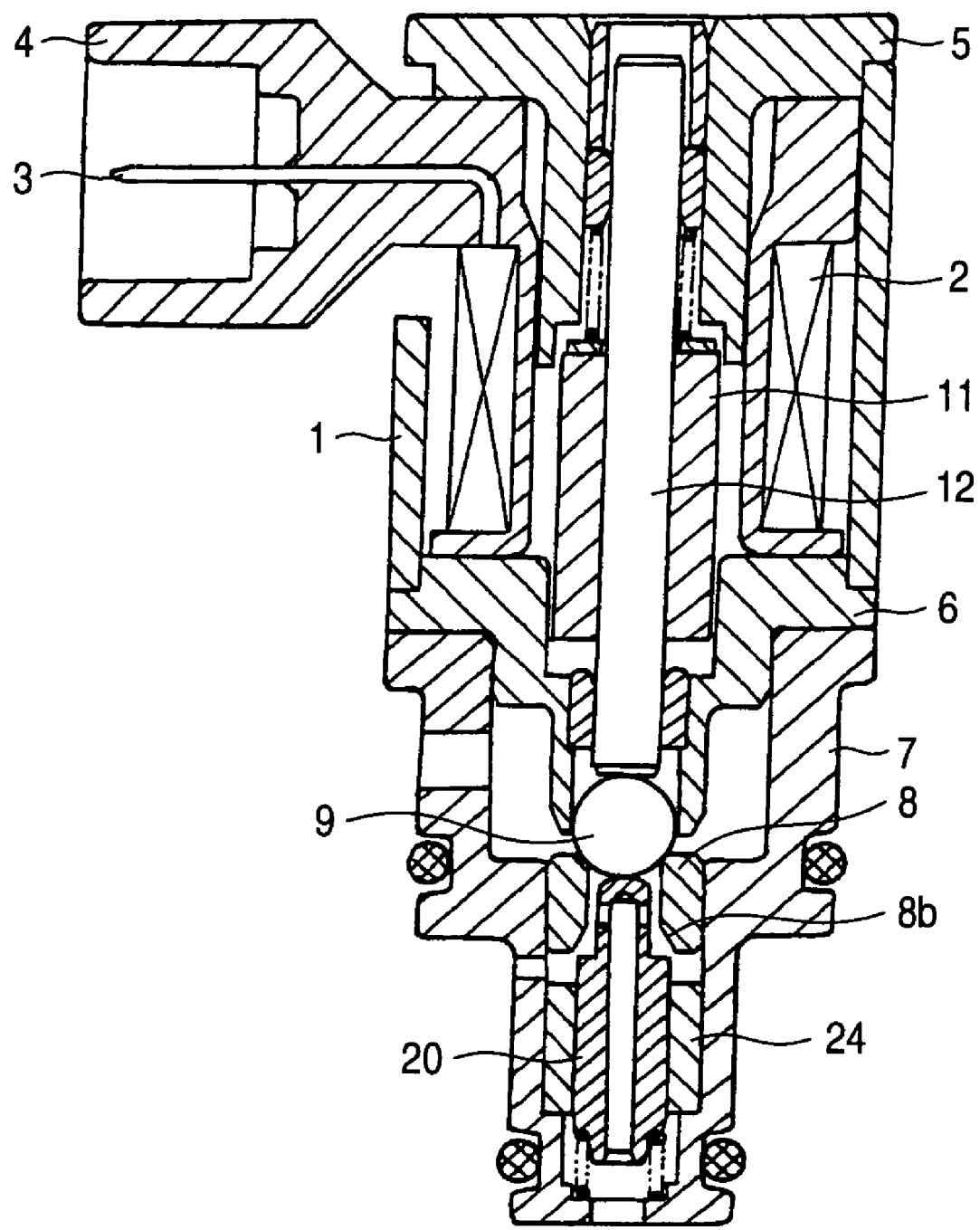
FIG. 7 is a sectional view of an N/H-type, three-way bleed type proportional electromagnetic valve according to a third embodiment of the invention which is a modification of the N/H-type, three-way bleed type proportional electromagnetic valve according to the first embodiment.

FIG. 7 is a sectional view of an N/H-type, three-way bleed type proportional electromagnetic valve according to a third embodiment of the invention which is a modification of the N/H-type, three-way bleed type proportional electromagnetic valve according to the first embodiment. In this embodiment, a guide member 24, which is employed as the stop valve guide 7g of the housing 7, is press-fit in the inner circumferential surface of the housing 7. In the first embodiment, the flow rate of leakage between the input port 7a and the output port 7b, that is, the sealability and the slidability, can be set properly by changing the settings of the radial clearance and the sealing length (i.e., axial length) of the sliding contact portion that consists of the outer circumferential surface of the stop valve element 20 and the stop valve guide 7g of the housing 7. However, the housing 7 should be re-produced each time, which is costly. In contrast, in this embodiment, by virtue of the use of the guide member 24 which is a separate component, the above items can be set arbitrarily merely by changing the specifications (the dimensions and the material) of the guide member 24 without changing the housing 7. As such, the third embodiment is superior in utility and advantageous in cost.

Embodiment 4

Figure 8:
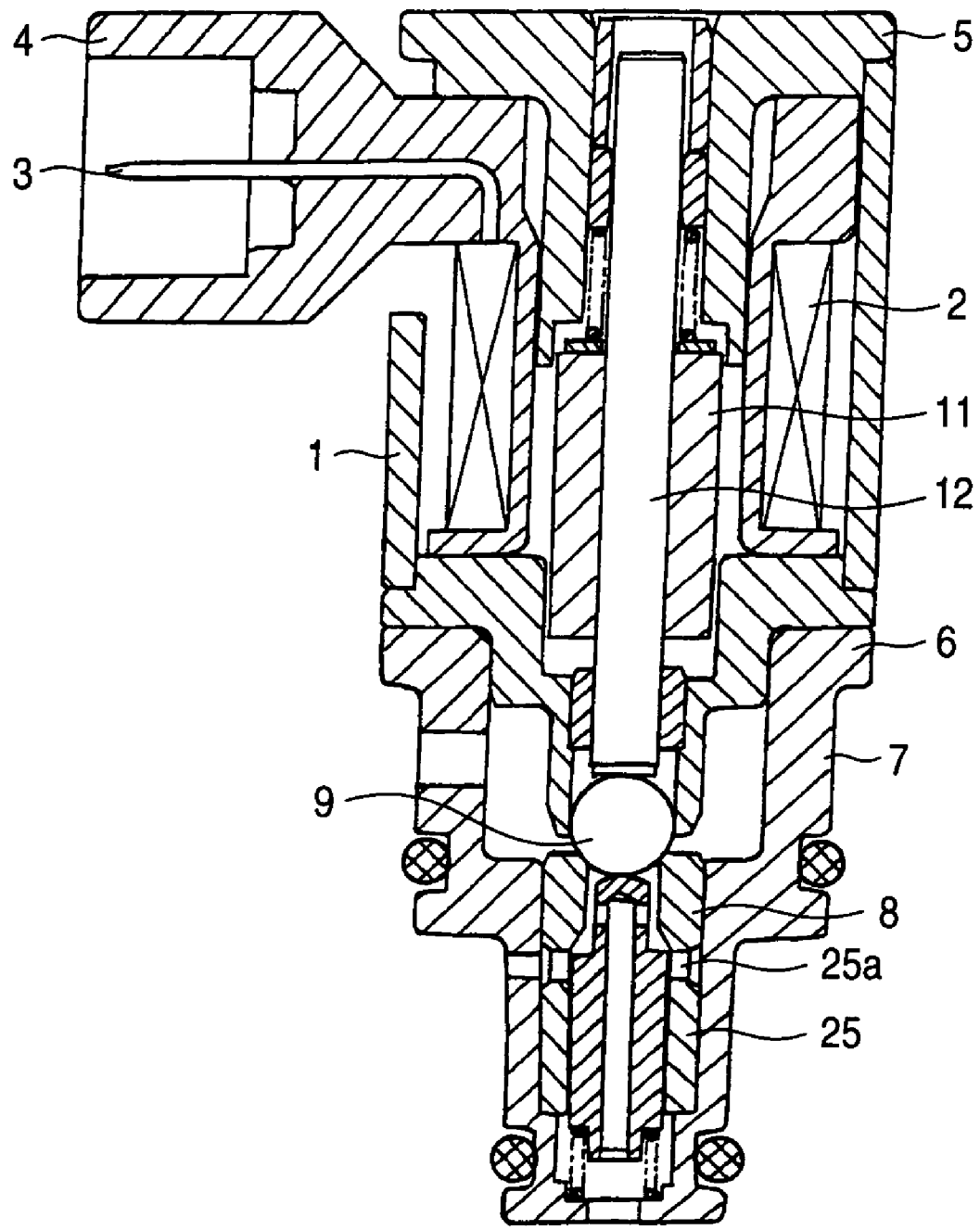
FIG. 8 is a sectional view of an N/H-type, three-way bleed type proportional electromagnetic valve according to a fourth embodiment of the invention which is a modification of the N/H-type, three-way bleed type proportional electromagnetic valve according to the third embodiment.

FIG. 8 is a sectional view of an N/H-type, three-way bleed type proportional electromagnetic valve according to a fourth embodiment of the invention which is a modification of the N/H-type, three-way bleed type proportional electromagnetic valve according to the third embodiment. In this embodiment, the valve seat 8 and the guide member 24 are integrated into a member 25 and lateral, ATF inflow holes 25a are formed through the member 25. The integral member 25 is press-fit in the inner circumferential surface of the housing 7.

In the third embodiment, if the concentricity between the stop valve seat portion 8b of the valve seat 8 and the inner circumferential surface of the guide member 24 (in the first and second embodiments, the stop valve guide 7g of the housing 7) becomes low, the resting performance of the sealing edge 20d of the stop valve element 20 on the stop valve seat portion 8b of the valve seat 8 is impaired and the sealability is lowered. As a result, in controlling the output pressure to the minimum value, the input port 7a may communicate with the ejection port 7c to cause a flow of ATF from the former to the latter.

Integrating the valve seat 8 and the guide member 24 increases the concentricity between the stop valve seat portion 8b of the valve seat 8 and the inner circumferential surface of the guide member 24 and hence can further stabilize the output pressure and flow rate characteristics.

Embodiment 5

Figure 9:
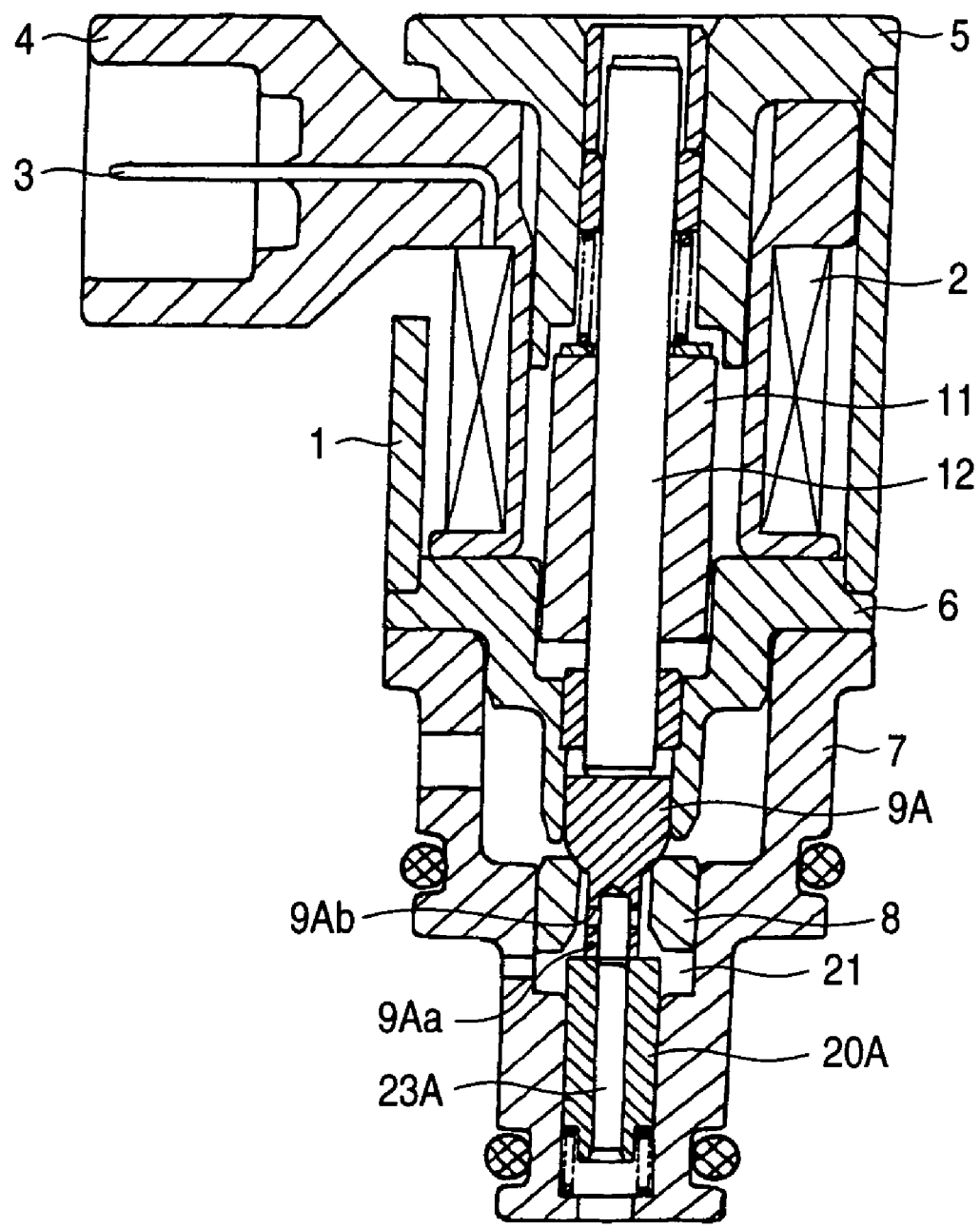
FIG. 9 is a sectional view of an N/H-type, three-way bleed type proportional electromagnetic valve according to a fifth embodiment of the invention which is another modification of the N/H-type, three-way bleed type proportional electromagnetic valve according to the first embodiment.

FIG. 9 is a sectional view of an N/H-type, three-way bleed type proportional electromagnetic valve according to a fifth embodiment of the invention which is another modification of the N/H-type, three-way bleed type proportional electromagnetic valve according to the first embodiment. In this embodiment, the shapes of the bleed valve element and the stop valve element are changed. A bleed valve element 9A according to this embodiment has a mortar-like shape rather than a spherical shape, and has a cylindrical projection 9Aa that extends toward a stop valve element 20A. The projection 9Aa is inserted in the valve seat communication hole 21 and the end face of the projection 9Aa is in contact with the stop valve element 20A. The projection 9Aa is formed with bleed valve element communication holes 9Ab that has openings in the end face and the side surface of the projection 9Aa. The stop valve element 20A has a shape as obtained by cutting off the small-diameter portion 20b of the stop valve element 20 of the first embodiment, and is formed with a stop valve element communication hole 23A having openings in both end faces of the stop valve element 20A. Whereas in the first embodiment the bleed valve element communication holes 20c are formed in the stop valve element 20, in this embodiment, the bleed valve element communication holes 9Ab are formed in the bleed valve element 9A. The bleed valve element communication holes 9Ab of this embodiment has substantially the same function as the bleed valve element communication holes 20c of the first embodiment.

Embodiment 6

Figure 10:
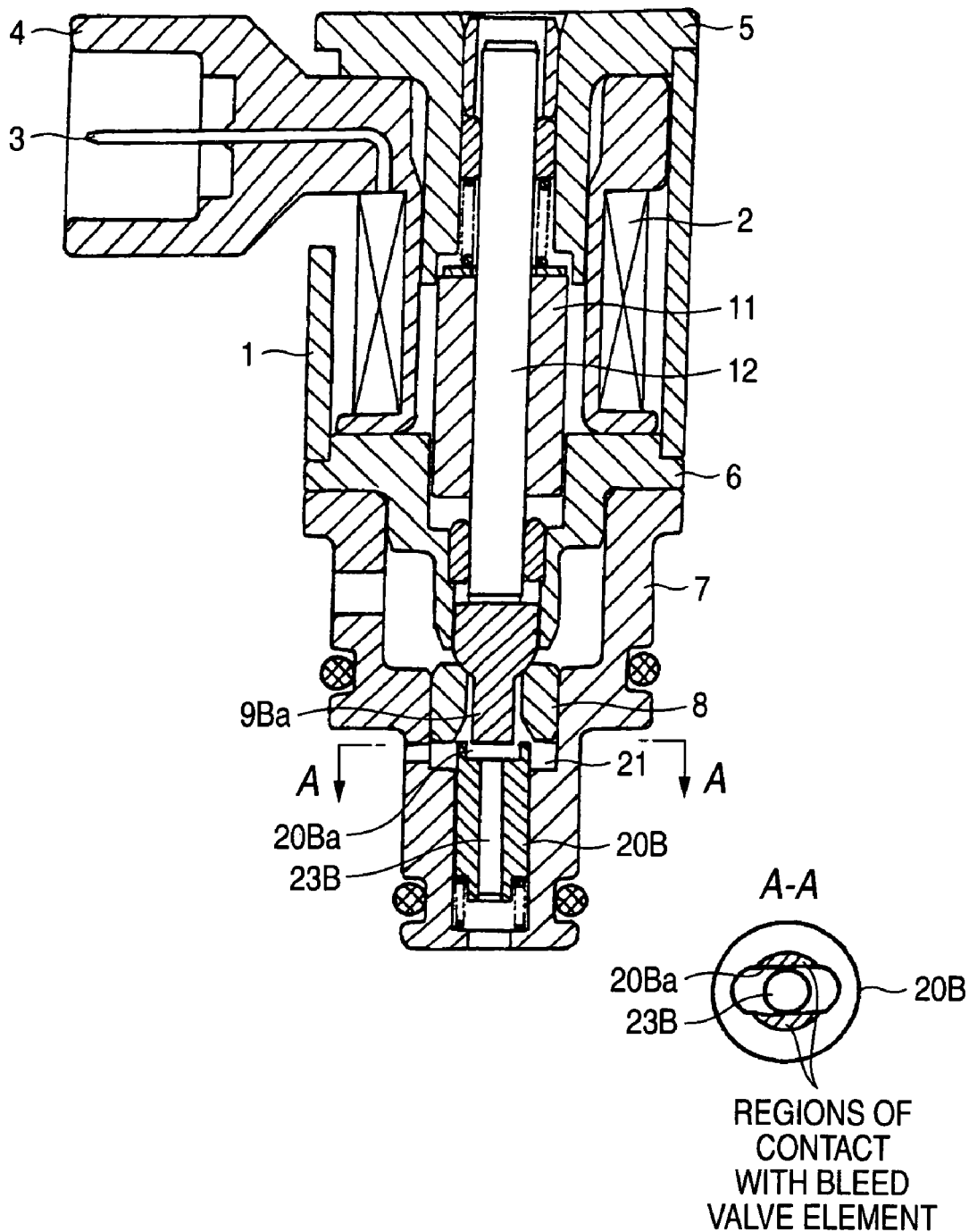
FIG. 10 is a sectional view of an N/H-type, three-way bleed type proportional electromagnetic valve according to a sixth embodiment of the invention which is a further modification of the N/H-type, three-way bleed type proportional electromagnetic valve according to the first embodiment.

FIG. 10 is a sectional view of an N/H-type, three-way bleed type proportional electromagnetic valve according to a sixth embodiment of the invention which is a further modification of the N/H-type, three-way bleed type proportional electromagnetic valve according to the first embodiment. In this embodiment, the shapes of the bleed valve element and the stop valve element are changed differently than in the first embodiment. A bleed valve element 9B has a mortar-like shape and has a solid projection 9Ba that extends toward a stop valve element 20B and is inserted in the valve seat communication hole 21. The end face of the projection 9Ba is in contact with the stop valve element 20B. The stop valve element 20B has a shape as obtained by cutting off the small-diameter portion 20b of the stop valve element 20 of the first embodiment. The top end face of the stop valve element 20B is formed with an elliptical groove 20Ba whose width is smaller than the outer diameter of the projection 9Ba of the bleed valve element 9B. The stop valve element 20B is formed with a stop valve element communication hole 23B having openings in the output-port-7b-side end face of the stop valve element 20B and the bottom surface of the elliptical groove 20Ba.

Therefore, in this embodiment, ATF flows into the stop valve element 20B through the openings adjacent to the regions where the bleed valve element 9B and the stop valve element 20B are in contact with each other (see the inset enlarged sectional view taken along line A—A). The elliptical groove 20Ba has the same function as the bleed valve element communication holes 9Ab of the fifth embodiment.

It goes without saying that each of the structures of the third to sixth embodiments can also be applied to the N/L-type, three-way bleed type proportional electromagnetic valve according to the second embodiment and, when so applied, provides the same advantages as the advantages of each of the third to sixth embodiments. The above-described structures according to the invention can be applied to not only bleed-type proportional electromagnetic valves for AT hydraulic circuits but also general electromagnetic valves for hydraulic control that are used in various machines.

What is claimed is:

1. A three-way bleed type proportional electromagnetic valve comprising:
   a solenoid coil;
   a core that is excited by energizing the solenoid coil;
   a plunger on which magnetic attractive force is exerted from the core when the core is excited;
   a bleed valve element that is in contact with or separated from a first seat portion of a valve seat depending on the magnetic attractive force acting on the plunger;
   a housing that houses the valve seat and the bleed valve element and has an input port, an output port, and an ejection port for control by means of the bleed valve element a subject fluid supplied via the input port such that fluid having a predetermined output pressure is discharged at the output port; and
   a stop valve element that is disposed in a cylindrical shape in a flow passage between the input port and the output port so as to be in sliding contact with a wall of the flow passage and that is in contact with or separated from a second seat portion of the valve seat,
   wherein in controlling an output pressure to a minimum value the stop valve element is brought in contact with the valve seat so as to close the input port and to cause the output port and the ejection port to communicate with each other.

2. The three-way bleed type proportional electromagnetic valve according to claim 1, wherein the stop valve element is formed with a stop valve element communication hole that enables the output port to communicate with the input port and the ejection port.

3. The three-way bleed type proportional electromagnetic valve according to claim 1, wherein the stop valve element can contact and be separated from the bleed valve element.

4. The three-way bleed type proportional electromagnetic valve according to claim 1, further comprising a spring disposed between the output port and an end of the stop valve element in its movable direction, for urging the stop valve element toward the valve seat.

5. The three-way bleed type proportional electromagnetic valve according to claim 1, wherein a maximum displacement of the stop valve element is set longer than a maximum displacement of a necessary range of the bleed valve element.

6. The three-way bleed type proportional electromagnetic valve according to claim 1, wherein the input port is disposed perpendicularly to a movable direction of the stop valve element.

7. The three-way bleed type proportional electromagnetic valve according to claim 1, wherein seat portions of the valve seat for the bleed valve element and the stop valve element are formed on confronting surfaces of the valve seat, respectively.

8. The three-way bleed type proportional electromagnetic valve according to claim 1, wherein the stop valve element has, at one end, an opening that always communicates with the output port and has, at the other end, an opening that can communicate with the input port and the ejection port.

9. The three-way bleed type proportional electromagnetic valve according to claim 2, wherein the stop valve element has a large-diameter portion that is in sliding contact with the housing and a small-diameter portion that is inserted in a valve seat communication hole and has an end that is in contact with the bleed valve element.

10. The three-way bleed type proportional electromagnetic valve according to claim 9, wherein the small-diameter portion of the stop valve element is formed with a bleed valve element communication hole that enables the input port and the ejection port to communicate with the stop valve element communication hole.

11. The three-way bleed type proportional electromagnetic valve according to claim 1, wherein the bleed valve element assumes a mortar-like shape and has a projection that can contact the stop valve element.

12. The three-way bleed type proportional electromagnetic valve according to claim 11, wherein the projection is formed with a bleed valve element communication hole that enables the output port to communicate with the input port and the ejection port.

13. The three-way bleed type proportional electromagnetic valve according to claim 1, further comprising a guide member that is press-fit in an inner circumferential surface of the housing, wherein the stop valve element is in sliding contact with the guide member.

14. The three-way bleed type proportional electromagnetic valve according to claim 13, wherein the valve seat and the guide member are integrated with each other.

15. The three-way bleed type proportional electromagnetic valve according to claim 11, wherein the stop valve element is formed, at an input-port-side end, with an elliptical groove whose width is smaller than an outer diameter of the projection of the bleed valve element.

16. The three-way bleed type proportional electromagnetic valve according to claim 1, wherein a maximum displacement of said stop valve element is greater than a maximum displacement of said bleed valve.

17. The three-way bleed type proportional electromagnetic valve according to claim 1, wherein said plunger is attached to a rod, and said bleed valve element is positioned to separate said rod from said stop valve element.

18. A three-way bleed type proportional electromagnetic valve comprising:
- a solenoid coil;
- a core that is excited by energizing the solenoid coil;
- a plunger on which magnetic attractive force is exerted from the core when the core is excited;
- a bleed valve element that is in contact with or separated from a valve seat depending on the magnetic attractive force acting on the plunger;
- a housing that houses the valve seat and the bleed valve element and has an input port, an output port, and an ejection port for control of a subject fluid;
- a stop valve element that is disposed in a flow passage between the input port and the output port so as to be in sliding contact with a wall of the flow passage and that is in contact with or separated from the valve seat,
- wherein in controlling an output pressure to a minimum value the stop valve element is brought in contact with the valve seat so as to close the input port and to cause the output port and the ejection port to communicate with each other; and
- wherein the stop valve element is formed, at an input-port-side end, with an elliptical groove whose width is smaller than an outer diameter of the projection of the bleed valve element.

19. A three-way bleed type proportional electromagnetic valve comprising:
- a solenoid coil;
- a core that is excited by energizing the solenoid coil;
- a plunger on which magnetic attractive force is exerted from the core when the core is excited;
- a bleed valve element that is in contact with or separated from a valve seat depending on the magnetic attractive force acting on the plunger;
- a housing that houses the valve seat and the bleed valve element and has an input port, an output port, and an ejection port for control of a subject fluid;
- a stop valve element that is disposed in a flow passage between the input port and the output port so as to be in sliding contact with a wall of the flow passage and that is in contact with or separated from the valve seat,
- wherein in controlling an output pressure to a minimum value the stop valve element is brought in contact with the valve seat so as to close the input port and to cause the output port and the ejection port to communicate with each other;
- wherein the stop valve element is formed with a stop valve element communication hole that enables the output port to communicate with the input port and the ejection port; and
- wherein the stop valve element has a large-diameter portion that is in sliding contact with the housing and a small-diameter portion that is inserted in a valve seat communication hole and has an end that is in contact with the bleed valve element.

20. The three-way bleed type proportional electromagnetic valve according to claim 19, wherein the small-diameter portion of the stop valve element is formed with a bleed valve element communication hole that enables the input port and the ejection port to communicate with the stop valve element communication hole.

* * * * *